(12) United States Patent
Gouhoury et al.

(10) Patent No.: US 12,308,727 B2
(45) Date of Patent: May 20, 2025

(54) ELECTRICAL CONNECTION MODULE FOR A GENERATOR SET AND GENERATOR SET COMPRISING SUCH A MODULE

(71) Applicant: SDMO Industries S.A.S., Guipavas (FR)

(72) Inventors: Francois Gouhoury, Guipavas (FR); Alain Arzel, Guipavas (FR); Sébastien Guénéguan, Guipavas (FR)

(73) Assignee: SDMO Industries S.A.S., Guipavas (FR)

( * ) Notice: Subject to any disclaimer, the term of this patent is extended or adjusted under 35 U.S.C. 154(b) by 0 days.

(21) Appl. No.: 18/492,083

(22) Filed: Oct. 23, 2023

(65) Prior Publication Data

US 2024/0136890 A1 Apr. 25, 2024
US 2024/0235326 A9 Jul. 11, 2024

(30) Foreign Application Priority Data

Oct. 21, 2022 (EP) ..................................... 22203131

(51) Int. Cl.
*H02K 7/18* (2006.01)
*H01R 12/51* (2011.01)

(52) U.S. Cl.
CPC ......... *H02K 7/1815* (2013.01); *H01R 12/515* (2013.01)

(58) Field of Classification Search
CPC .. H02K 7/1815; H01R 12/515; H01R 13/514; H01R 13/02; H01R 13/66; H01R 2201/10; F02D 41/266; F02D 2400/22; F02D 29/06; F02B 63/04
See application file for complete search history.

(56) References Cited

U.S. PATENT DOCUMENTS

| | | | |
|---|---|---|---|
| 2002/0117859 A1* | 8/2002 | Kraus | ...................... F02B 63/04 290/41 |
| 2022/0290627 A1* | 9/2022 | Revidat | ................. F02D 41/263 |
| 2023/0040396 A1* | 2/2023 | Sturm | ................ H01R 13/6215 |

* cited by examiner

*Primary Examiner* — Joseph Ortega
(74) *Attorney, Agent, or Firm* — The Belles Group, P.C.

(57) ABSTRACT

The invention relates especially to an electrical connection module for a generator set comprising an alternator connected to a heat engine, formed by at least one sub-set of cylinders, said module comprising a casing housing a printed circuit supporting: electric power supply terminals for said printed circuit; a first connector of an electrical harness allowing, in each sub-set of cylinders, connection of at least one device for measuring and controlling parameters of said sub-set of cylinders to a control module of said sub-set of cylinders; second connectors for electrical protection members of said electrical harness; and a third connector for diagnosing the operating state of each control module.

19 Claims, 4 Drawing Sheets

ELECTRICAL CONNECTION MODULE FOR A GENERATOR SET AND GENERATOR SET COMPRISING SUCH A MODULE

CROSS-REFERENCE TO RELATED PATENT APPLICATIONS

The present application claims priority to European Patent Application No. 22203131.2, filed on Oct. 21, 2022. The disclosure of the aforementioned priority application is incorporated herein by reference in its entirety.

FIELD OF THE INVENTION

The field of the invention is that of generator sets using a heat engine driving an alternator. The invention relates in particular to the electrical connection of the engine control means of such generator sets.

BACKGROUND OF THE INVENTION

A generator set is a self-contained device that uses a heat engine to produce electric energy, either to compensate for an interruption in the public electric power grid, or to supply electrical apparatuses in zones devoid of access to the electric power grid.

Characteristics of these generators are extremely variable, depending on the applications and the specific needs and/or restrictions specific to each situation, in terms of the electric power desired and overall size, for example. As a result, there is a wide range of generator sets. They are generally manufactured in small series, or even on a case-by-case basis, with different engine drives to adapt to different needs and situations. In particular, generator set manufacturers can provide many different types of engine from different engine manufacturers, which means that the means for controlling and driving these engines (ECU, diagnostic socket, fuses, etc.) have to be adapted on a case-by-case basis and then mounted in an appropriate position on the set. As a result, the manufacturer, and then the personnel using and/or maintaining the set, have to manage and connect wiring of the different electrical harnesses in a way that is specific to each set, which requires precise knowledge of each of these generator sets, meticulous and complex connectivity work, generally by screwing, and leads to the risk of wiring errors or wrong connections.

A generator set commonly comprises: a heat engine; an alternator connected to the heat engine to enable to transform energy received from the heat engine into electric energy; a plurality of electrical devices for measuring and controlling parameters of the heat engine; a module for controlling the heat engine; an energy source for supplying electricity to at least the electrical measurement and control devices and the control module; and an electrical wiring harness to be capable of connecting together the electrical measurement and control devices, the control module and the energy source.

In the particular case of generator sets that need to generate large electric powers, a heat engine with a large number of cylinders is generally required. However, a control module is limited in the number of cylinders it can control. It is therefore also necessary to implement several control modules, each dedicated to the specific management of a sub-set of cylinders. In such a case, it is not easy for an operator to control the whole system.

It is, of course, known to implement a fuse box, interfaced between the energy source and the electrical wiring harness, in order to ensure protection of the electrical equipment it connects, namely the measurement and control devices and control module(s) especially.

However, the fuse boxes used are generally standard, off-the-shelf devices, which are well adapted to large production runs, but are not suitable for effective use when engine drives vary from case to case. Furthermore, they are not adapted to the requirements and restrictions relating to generator sets, such as vibration, heat and splashing.

Furthermore, such fuse boxes require the ends of the wiring in the harness to be stripped so that they can be connected by screwing them to the terminals in the box. Further to a complex and time-consuming installation, vibration of the generator set during operation is likely to cause the wiring in the harness to become unsecured. The consequences of such unsecurement can be dramatic for the generator set itself and for people in its immediate environment. For example, such unsecurement of wiring can lead to malfunction, breakdown or even destruction of the generator set. Splashes that may be emitted by the generator set may also damage these connections or bring several terminals into contact, thus giving rise to the risks described above.

In addition, such vibration is also likely to cause the fuse box to become unsecured from the generator set as a result of rough and/or rudimentary assembly due to a generic structure of the casing which is not adapted. Such unsecurement is also likely to cause the wiring in the harness to pull out, thus giving rise to the risks described above.

There is therefore a need to provide a new technique for overcoming all or some of the drawbacks of known solutions. There is also a need to provide such a technique that is effective and durable, easy to implement, install, maintain and use. There is also a need to provide a compact technique, limiting its overall size on the generator set. There is furthermore a need for a simple and effective solution, despite the large number of engine drives that can be implemented, so as to avoid as far as possible the development of a dedicated solution for each engine drive, in order to simplify the implementation and use of a generator set. There is therefore a need to provide a technique to simplify the work of a technician or operator working on the generator set.

SUMMARY OF THE INVENTION

The technique provided relates, according to a first aspect, to an electrical connection module for a generator set comprising an alternator connected to a heat engine, formed by at least one sub-set of cylinders, so as to transform energy received from said heat engine into electric energy, the module comprising a casing inside which is housed a printed circuit supporting: power supply terminals for the printed circuit; a first connector of an electrical harness allowing, in each sub-set of cylinders, connection of at least one device for measuring and controlling parameters of said sub-set of cylinders to a control module of said sub-set of cylinders; second connectors for electrical protection members of the electrical harness; and a third connector for diagnosing the operating state of each of the control modules.

Thus, by integrating electrical components providing different functions (electrical protection, diagnostics, etc.) for one or more, classically two, sub-set(s) of cylinders, in a single connection module, structurally adapted to the restrictions and requirements relating to the generator set associated therewith, it is possible to improve safety and reduce the overall size of the generator set.

According to one particular characteristic of the technique provided, the first connector is a connector of an electrical harness allowing connection of at least two devices for measuring and controlling parameters of at least two sub-sets of cylinders respectively, forming the heat engine, to at least two control modules of the sub-sets of cylinders respectively, and said third connector is a connector for diagnosing the operating state of each of said control modules.

Thus, a single module according to the invention allows for control of a plurality, for example two or more, of sub-sets of cylinders. It is not necessary to duplicate modules in order to provide one module per sub-set.

According to another particular characteristic of the technique provided, the electrical connection module further comprises at least one indicator representative of an operating state of each control module of a sub-set. Such an indicator especially enables technicians to quickly identify a faulty or defective control module. It is further used to inform technicians that, even if the heat engine is switched off, one or more control modules are still operating (data recording phases) and that it is appropriate to wait for the end of recording before switching off the power supply. More particularly, the electrical connection module can comprise a plurality of indicators, each representative of an operating state of a control module associated with a sub-set of cylinders of the heat engine. Such an arrangement allows, especially, more precise monitoring of the operating state of the control modules and rapid identification of the defective or switched-off one(s).

According to another particular characteristic of the technique provided, the printed circuit further supports a fourth connector for at least one device auxiliary to the heat engine. The implementation of such fourth connector makes it possible to improve versatility of the electrical connection module, by allowing it to be used for the electrical connection of a lighting unit for the generator set or an exhaust gas treatment unit, for example.

According to a particular characteristic of the technique provided, the electrical connection module is mounted to a support plate integral with the heat engine. Such an arrangement makes it possible, especially, to simplify structure of the casing, by dispensing with variations in the external relief of the heat engine according to the type of engine used. This results in simplifying manufacture and facility of the electrical connection module. It also enables the electrical connection module to be disposed as close as possible to the heat engine, in order to reduce the length of the engine wiring harness, for example. More particularly, the casing can comprise a base, arranged against the support plate, sealingly secured to a cover having a common face from which the first and third connectors project. Such an arrangement of connectors makes it especially easy to connect complementary connectors.

According to another particular characteristic of the technique provided, the power supply terminals project from the casing. Such an arrangement makes it especially easy to connect the wiring coming from the power supply without having to dismantle the casing completely. Such an arrangement finds particular interest when the ends of the wiring carry connectors, typically lugs, which are coated with electrical protection.

According to another particular characteristic of the technique provided, the casing comprises a removable hatch providing access to at least the second connectors. Such a hatch is especially useful for simplifying access to the second connectors in order to install or replace protection members, without requiring complete dismantling of the casing and/or unsecurement thereof from the engine (or support plate).

The technique provided is concerned, according to a second aspect, with a generator set comprising: a heat engine formed by at least one sub-set of cylinders; an alternator connected to the heat engine so as to transform energy received from the heat engine into electric energy; in each sub-set of cylinders, at least one device for measuring and controlling parameters of the sub-set of cylinders; in each sub-set of cylinders, a module for controlling the sub-set of cylinders; an electrical harness for connecting the at least one measurement and control device to at least one control module; and, according to the invention, an electrical connection module comprising a casing inside which is housed a printed circuit supporting: power supply terminals for the printed circuit; a first connector of the electrical harness; second connectors for the electrical protection members of the wiring harness; and a third connector for diagnosing the operating state of each control module.

According to a particular characteristic of the technique provided, the heat engine is formed by at least two sub-sets of cylinders, and in that the electrical harness allows connection of at least two devices for measuring and controlling parameters of the at least two sub-sets of cylinders respectively to at least two control modules of the sub-sets of cylinders respectively, and in that the third connector is a connector for diagnosing the operating state of each of the control modules.

BRIEF DESCRIPTION OF THE FIGURES

The technique provided, and the different advantages thereof, will be more easily understood in the light of the following description of an illustrative and non-limiting embodiment thereof, and of the appended drawings, of which.

DETAILED DESCRIPTION OF THE INVENTION

At the cost of an innovative approach and of non-obvious developments of fuse boxes, the inventors of the present technique have determined that, contrary to the a priori view of the person skilled in the art who would offset the fuse box from the heat engine, in order to dispense with restrictions associated with structural diversity, it is preferable to develop a multi-purpose multifunction electrical connection module integrating, into a single and multi-purpose box, withstanding the restrictions in question, separate technical means performing several functions.

On the basis of this observation, the inventors determined that it was particularly relevant to bring together in such a multi-purpose module, as a minimum, the electrical protection functions of the devices for measuring and controlling the parameters of the heat engine and for diagnosing the control module(s).

The general principle of the invention therefore consists of an optimised and multi-purpose pool (i.e. not specific to a particular engine) in an electrical connection module for a heat engine generator set.

According to the invention, such a module comprises a casing inside which is housed a printed circuit supporting: electric power supply terminals for the printed circuit; a first connector of an electrical harness for connecting devices for measuring and controlling parameters to one or more control module(s) associated with the heat engine, this first connector communicating with the, or selectively with each of the, control module(s), via dedicated wiring of the electrical harness or via a bus linking these control modules; second connectors for electrical protection members in the wiring harness (fuses); and a third connector for diagnosing the operating state of said control modules.

Thus, by integrating electrical components performing different functions (electrical protection, diagnostics, etc.) in a single connection module, structurally adapted to the restrictions and requirements of the generator set associated therewith, it is possible to improve safety and reduce the overall size of the generator set.

This approach makes it possible to develop a single casing gathering in a simple and organized way the fuses (a hatch can be provided for direct access to them) and the control/drive connector on the one hand and the diagnostic connector on the other hand of at least one, effectively two (or even more) for generator sets that have to generate significant electric power, sub-set(s) of cylinders via single connectors.

This makes it possible to have, at reduced cost, a single casing, which can be effectively protected especially against moisture, dust and vibration. All connections can be made by plugging, without the need to strip and screw wiring.

Its uniqueness also makes it easier to mount the casing to different generator sets. Furthermore, such a casing is adapted to any type of heat engine (whatever the ECU especially), and enables two (or even more) control modules associated with a single heat engine to be managed via one casing. It is, of course, possible to use the box with a single control module, where this is possible, which offers universality of implementation, without the need to develop or adapt a casing to each engine configuration.

In other words, a same electrical connection module, in accordance with the technique provided, can just as easily be implemented on a "large generator set", equipped with a plurality of ECUs each associated with a sub-set of cylinders (ten cylinders, for example) of the heat engine (comprising twenty cylinders overall, for example), as on a "small generator set", equipped with a single ECU associated with all the cylinders of the heat engine. In such a situation, by abuse of language, it is considered that the heat engine comprises a single sub-set of cylinders.

The technique provided is concerned, according to a second aspect, with a generator set equipped with such an electrical connection module.

One exemplary embodiment of the technique provided is illustrated below, by way of a simple illustrative and non-limiting example, with reference to FIGS. 1 to 5, which refer to a generator set whose heat engine comprises two sub-sets of cylinders, each managed by a control module.

Nevertheless, as will become clearer later, the technique provided is not limited to this implementation and can, without modifying the casing or adapting the connectors, be implemented with an engine comprising a sufficiently limited number of cylinders to be managed by a single control module. Subsequently, the same elements have been designated by the same references in the different figures. In the figures, scales and proportions are not strictly respected, for the purposes of illustration and clarity.

Figure 1:
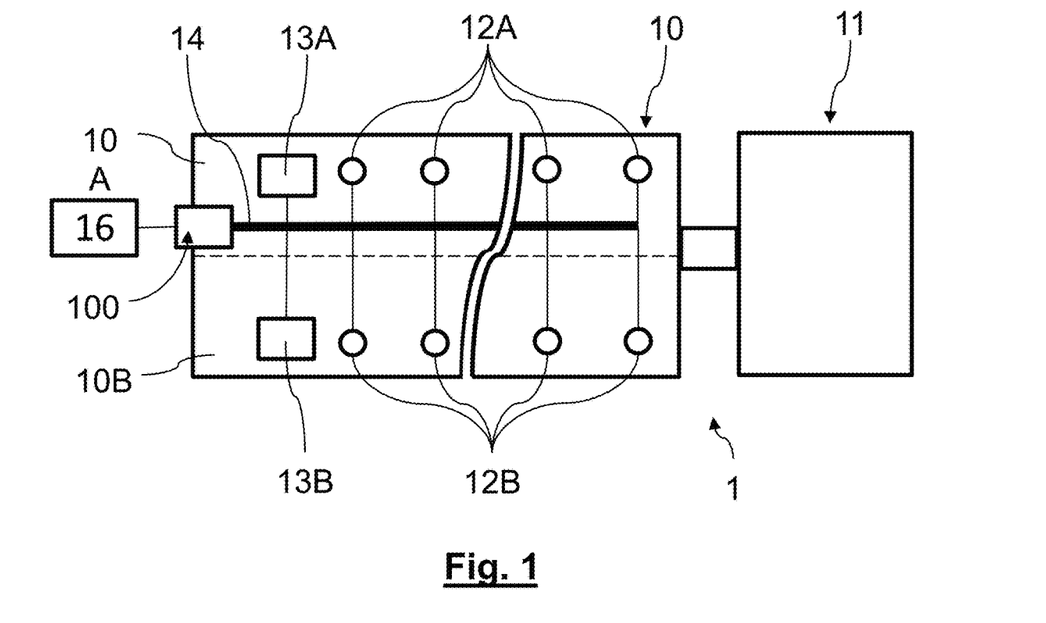
FIG. 1 schematically represents, in a top view, one example of a generator set equipped with an electrical connection module in accordance with the technique provided.

FIG. 1 schematically represents a generator set equipped with an electrical connection module, in accordance with the technique provided, an exemplary embodiment of which is illustrated in FIGS. 2 to 5.

As schematically represented in FIG. 1, a generator set 1 comprises a frame (not illustrated) supporting a heat engine 10, comprising a plurality of cylinders, twenty in the example illustrated, connected to an alternator 11 to be able to transform energy received from the heat engine 10 into electric energy. This heat engine 10 can be of any type. It can especially be an Otto cycle, diesel cycle, Rankine cycle, Brayton cycle engine, and in general any type of heat engine.

The generator set 1 additionally comprises a plurality of electrical devices 12A, 12B for measuring and controlling parameters of the heat engine 10. These measurement devices are, for example, oil pressure, coolant temperature and crankshaft position sensors. The control devices are, for example, timing and injection solenoids.

The generator set 1 further comprises at least one control module 13A, 13B for the heat engine 10. Such a control module 13A, 13B, typically a calculator, also known as an "ECU" (Electronic Control Unit), makes it possible to optimize performance of the heat engine 10, and therefore of the generator set 1. To do this, the control module 13A, 13B includes a decision algorithm that optimizes, in real time, operation of the control devices as a function of information collected from the measurement devices.

In practice, a control module (ECU) 13A, 13B can manage a limited number of cylinders, for example ten. However, it is often necessary, for a generator set, to have high power, and therefore to use a large number of cylinders, going beyond management capabilities of a single control module. In such a situation, corresponding to the example illustrated, the heat engine 10 comprises a set of twenty cylinders organized into two sub-sets of ten cylinders, 10A, 10B, typically in two rows of ten cylinders. Thus, each sub-set of cylinders is controlled by a control module 13A, 13B. In this case, two ECUs are therefore required, to independently manage each of the sub-sets of cylinders. Preferably, as in the example illustrated, a Master-Slave communication protocol links both control modules 13A, 13B, in order to ensure efficient and safe management of the heat engine 10 as a whole.

The generator set 1 also includes an energy source 16, typically a battery, to supply the measurement and control devices 12A, 12B and the control modules 13A, 13B with electricity. An electrical wiring harness 14, also known as an engine harness, connecting different electrical elements, namely the measurement and control devices and the control modules especially, to each of the sub-sets of cylinders, is also provided. Similarly, a diagnostic connector enables both sub-sets of cylinders to be controlled via a single connection.

The generator set 1 further comprises an electrical connection module 100, interfacing between the energy source 16 and the harness 14, requiring a set of fuses to protect the whole in the event of failure of one of the elements. The electrical connection module 100 therefore includes electric power supply terminals for this purpose.

According to the invention, the electrical connection module 100, which is more clearly visible in FIGS. 2 to 5, comprises a casing 110 inside which is housed a printed circuit 120 supporting: a first connector C-Fus of the engine harness 14; second connectors F1-F18 for the electrical protection members of the engine harness 14; and a third connector C-Diag for diagnosing the operating state of both control modules 13A, 13B.

Thus, the electrical connection module 100 in accordance with the technique provided makes it possible to centralize in a single casing, structurally adapted to restrictions and requirements of the generator sets, several functions essential to the operation and maintenance of the generator set associated therewith.

Figure 2:
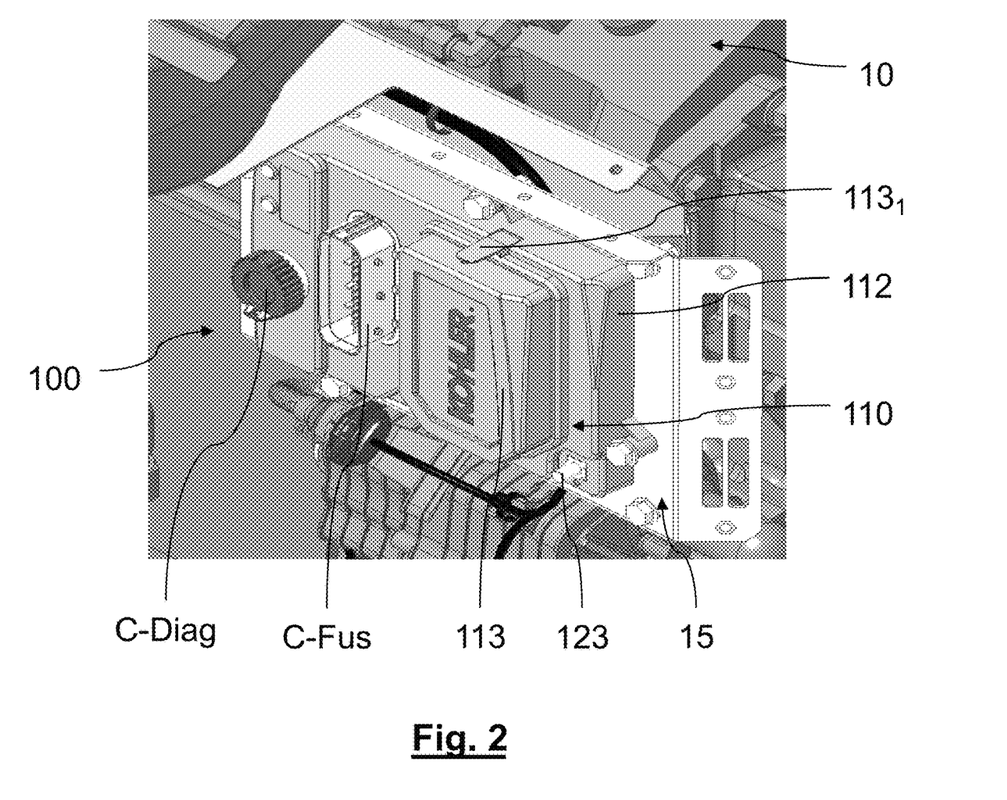
FIG. 2 illustrates, in a partial perspective view, a structural example of an electrical connection module, in accordance with the technique provided, mounted to a generator set.
Figure 3:
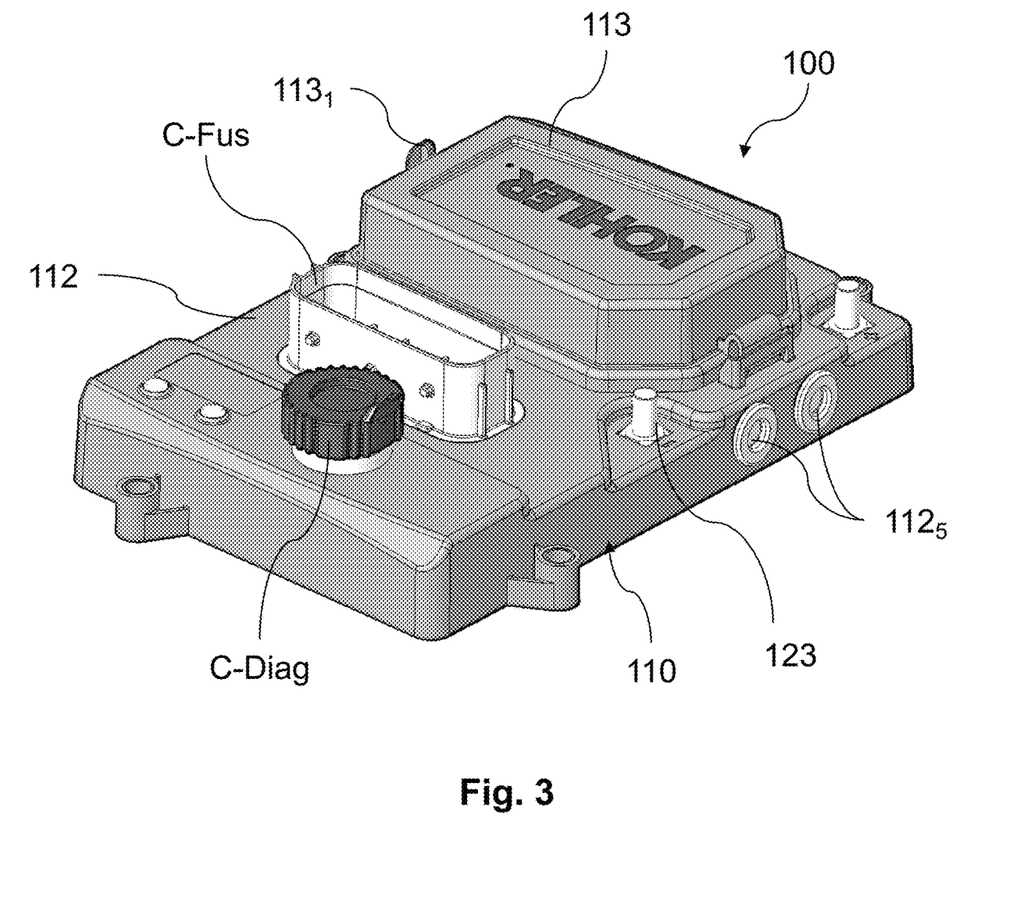
FIG. 3 is an isolated view of the electrical connection module of FIG. 2.
Figure 4:
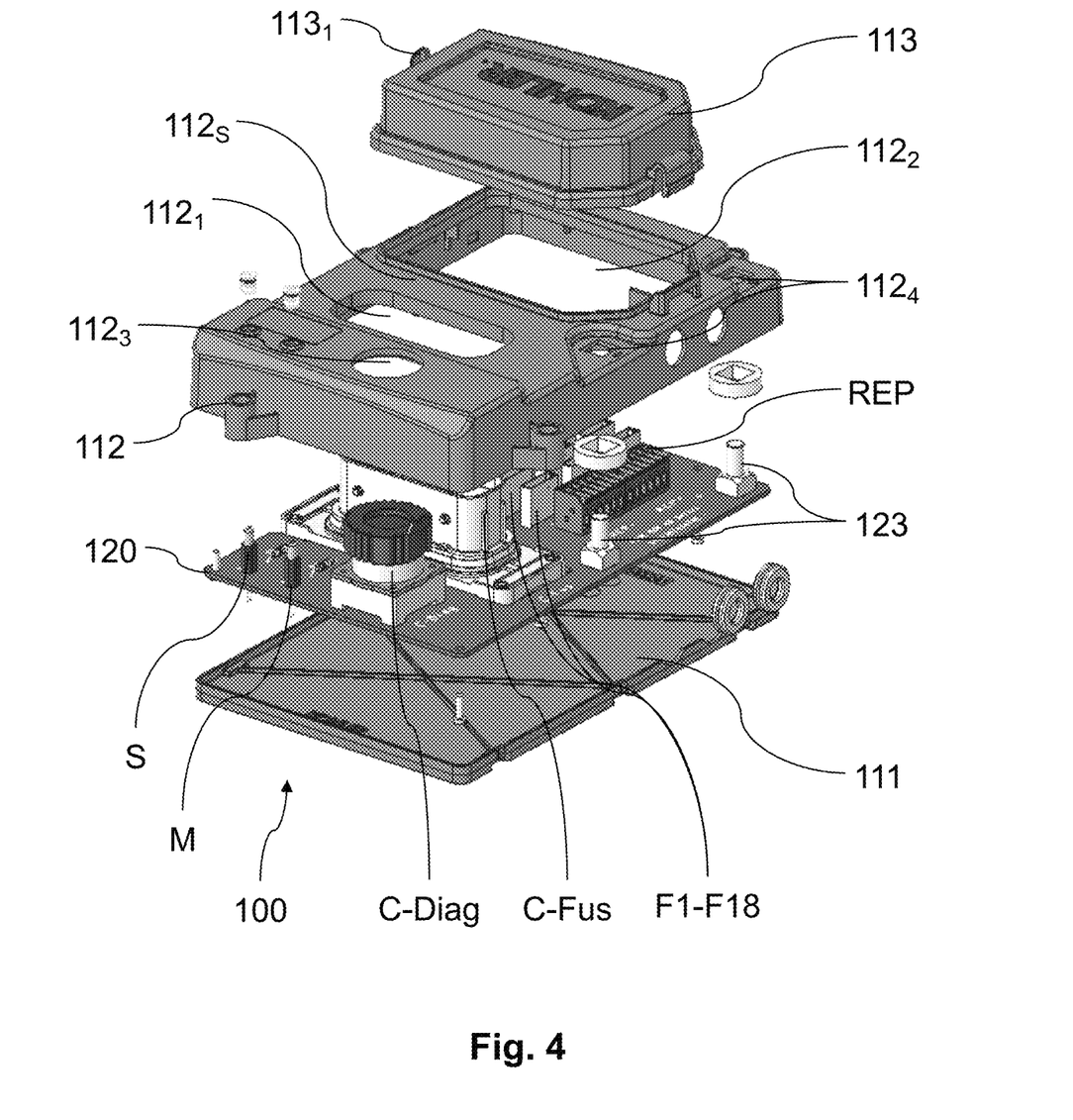
FIG. 4 is a partially exploded view of the electrical connection module of FIG. 3 illustrating different electronic components mounted to a printed circuit.

The casing 110 comprises a base 111, configured to be disposed against a support plate 15 integral with the heat engine 10, a cover 102, or cap, sealingly secured to the base 111. Thus, when the electrical connection module 100 is assembled, the printed circuit 120 is held between the base 111 and the cover 12.

The cover 112 of the casing comprises a first port $112_1$ for passing the first connector C-Fus so as to allow it to project from the casing 110 for connection to the engine harness 14. The cover 112 of the casing comprises a second port $112_2$ arranged opposite the second connectors F1-F18 so as to allow for the installation of protection members in the latter. The cover 112 of the casing further comprises a third port $112_3$ for passing the third connector C-Diag so as to enable it to project from the casing 110 for connection to a diagnostic tool (not represented) capable of communicating with both sub-sets of cylinders.

The first, second and third ports $112_1$, $112_2$, $112_3$ are arranged on a common face $112_S$ of the cover 112 so as to simplify connections of the first and third connectors C-Fus, C-Diag and the protection members.

The casing 110 additionally includes a removable hatch 113 for access to the second connectors F1-F18 in order to simplify installation of the electrical protection members and replacement of faulty ones. The removable hatch 113 thus selectively seals the second port $112_2$ in the cover 112. The casing 110 further comprises fourth ports $112_4$ for passing the electric power supply terminals 123 of the printed circuit 120.

The first connector C-Fus, comprising a plurality of pins, is adapted to cooperate with a complementary connector of the engine harness 14. This ensures rapid and secure connectivity.

Figure 5:
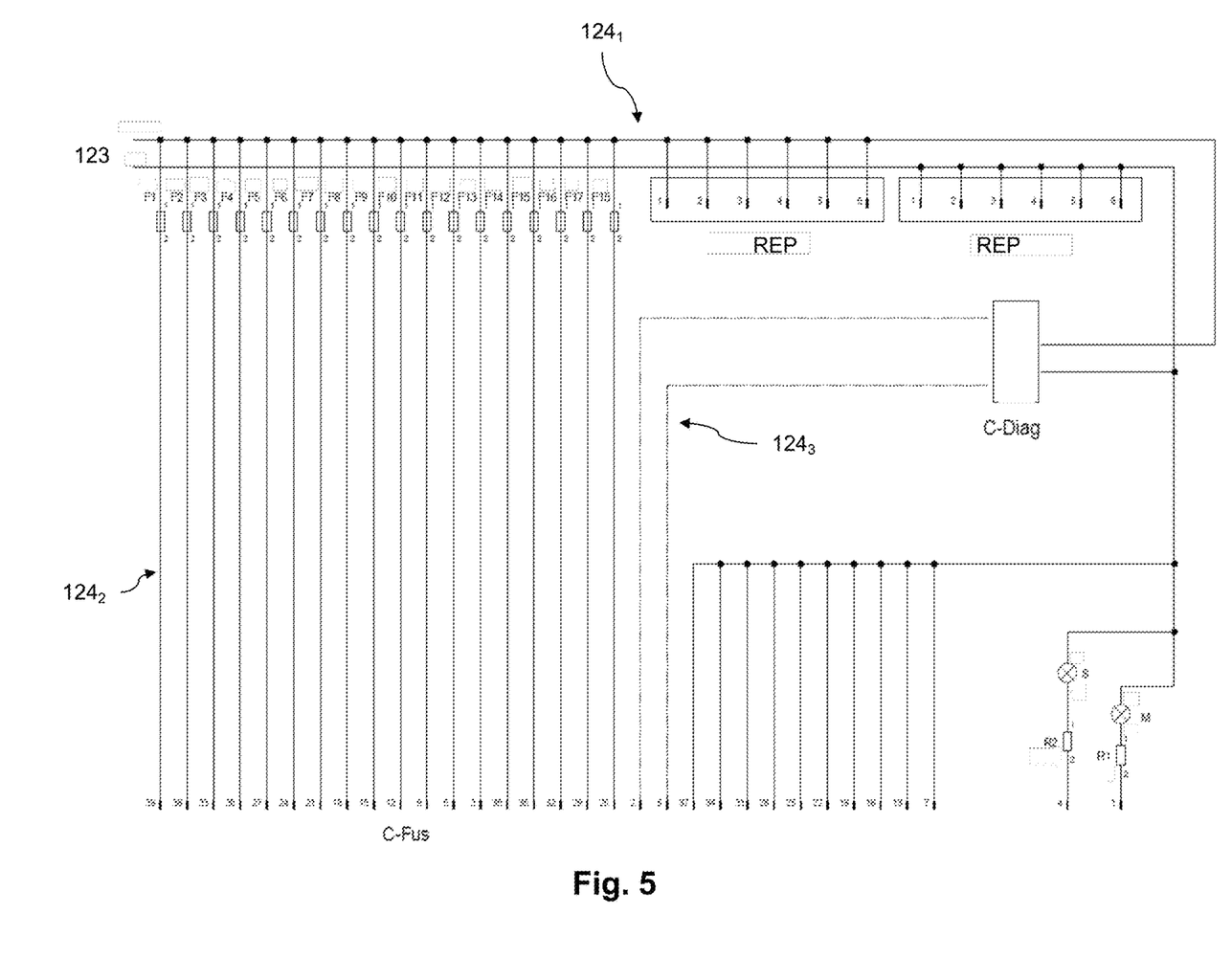
FIG. 5 schematically represents the electrical circuit of the electrical connection module of FIG. 2.

The third connector C-Diag is functionally connected, via electrical tracks, to both control modules 13A, 13B so as to centralize recovery for the diagnostic operation. To do this, the second connector C-Diag is connected to the control modules 13A, 13B via a CAN (Controller Area Network) bus integrated into the engine harness 14. The faulty control module and the fault itself are subsequently identified by the diagnostic tool.

According to the embodiment of the figures, the electrical connection module 100 further comprises two indicators M, S, typically light emitting diodes, representative of the operating state of the "Master-Slave" control modules 13A, 13B respectively.

Such indicators M, S indicate the power supply state of the control modules 13A, 13B. This informs technicians when the generator set is shut down for maintenance, if they can open the 24V circuit which will cut power to the control modules. (The 24V circuit opens when the diodes turn off). This also makes it possible to inform technicians that, even if the heat engine is stopped, one or more control modules are still operating (data recording phases) and that it is appropriate to wait for the end of recording before switching off the power supply.

According to the embodiment of the figures, the electrical connection module 100 additionally includes fourth connectors REP for devices auxiliary to the generator set, such as lighting and/or heat engine exhaust gas treatment devices, for example. The casing 110 therefore has fifth ports $112_5$ for passing wiring from the auxiliary devices to the fourth connectors REP.

Furthermore, in order to ensure operation of the electrical connection module 100, the printed circuit 120 especially comprises: first electrical tracks $124_1$ connecting the supply terminals 123 to first pins of the first connector C-Fus, to the second connectors F1-F18, to the third connector C-Diag and, if present, to the indicators M, S and to the fourth connectors REP; second electrical tracks $124_2$ connecting the second connectors F1-F18 to second pins of the first connector C-Fus; and third electrical tracks $124_3$ connecting the third connector C-Diag to third pins of the first connector C-Fus, to be connected to the CAN bus.

In the example illustrated, the electrical connection module 100 is secured to the support plate 15 by screws passing through ports provided in the cover 112 of the casing 110.

The casing 110, which is substantially parallelepipedic in shape, is here made of a glass-fiber reinforced polyamide. Obviously, any other material, preferably plastic, which is resistant to high temperatures, dust and fluid protection can be contemplated.

The first, second and third ports $112_1$, $112_2$, $112_3$ are arranged on the upper face $112_S$ of the cover 112, i.e. on the face opposite to the base 111 of the casing. This makes connecting the connectors easier for the technician who is positioned in front of the electrical connection module 100.

In the example illustrated, the hatch 113 has a locking mechanism 1131, via a reversible ratchet mechanism, to the cover 112 to ensure that they are assembled. Any other locking mechanism may alternatively be contemplated, provided that it enables the cover 113 to be sealingly held against the cover 112.

The electrical connection module 100 comprises eighteen second fuse connectors F1-F18. Obviously, the number of second connectors F1-F18 can be adapted especially as a function of the number of electrical measurement and control devices 12A, 12B to be supplied with electric power.

In the embodiment previously described, the heat engine comprises two sub-sets of cylinders each associated with a respective control module. The electrical connection module therefore comprises two separate indicators for independently checking the operating state of both control modules. However, to limit manufacturing costs and reduce overall size of the module, it may be contemplated to implement a single common indicator.

In another embodiment, not illustrated, the heat engine comprises a sufficiently limited number of cylinders (defining, through misuse of language, a single sub-set) and therefore a single control module thereof. In such a configuration, a single indicator is used. Alternatively, the casing of the connection module is shaped so as to cover the second, unused indicator. This simplifies production of the module, especially by retaining a common electronic circuit.

In another embodiment not illustrated, the casing is devoid of access hatch in order especially to simplify design of the electrical connection module and/or to optimize the sealing thereof. In this embodiment, access to the inside of the casing is therefore gained by opening or removing the base cover.

In another embodiment not illustrated, the electrical connection module is devoid of the fourth connector for connecting the auxiliary devices to the generator set. As the use of such auxiliary devices is not very widespread for low-power generator sets, dispensing with such a connector especially makes it possible to limit manufacturing costs and reduce the overall size of the module.

It is therefore clear that the technique provided is not limited to the embodiments described above, which are provided by way of example only. It encompasses various modifications, alternative forms and other variants that the person skilled in the art may contemplate within the scope of the invention and especially any combination of the different embodiments described above, which may be taken separately or in combination.

According to different aspects, the technique provided therefore has all or some of the following advantages, depending on the embodiments or alternatives retained: improving integration of components in the electrical connection module; providing versatile electrical connection module; simplifying installation for the electrical connection module; reducing overall size of the electrical connection module; ensuring durability and/or robustness of the versatile electrical connection module; ensuring safety of the generator set; guaranteeing operation of the generator set; ensuring safety of people in the generator set environment; simplifying maintenance of the generator set; simplifying the structure of the generator set. etc.

The invention claimed is:

1. An electrical connection module for a generator set comprising an alternator connected to a heat engine, said heat engine comprising a first sub-set of cylinders and a second sub-set of cylinders, said alternator being configured to transform energy received from said heat engine into electric energy, said module comprising a casing inside which is housed a printed circuit supporting:
   electric power supply terminals for supplying power to said printed circuit;
   a first connector of an electrical harness allowing the connection of at least one device for measuring and controlling parameters of said first sub-set of cylinders to a first control module of said first sub-set of cylinders and the connection of at least one device for measuring and controlling parameters of said second sub-set of cylinders to a second control module of said second sub-set of cylinders;
   second connectors for electrical protection members; and
   a third connector for connecting to each said control module to assess the operating state of each said control module.

2. The electrical connection module according to claim 1, wherein said first connector is a connector of an electrical harness allowing the connection of first and second devices for measuring and controlling parameters of said first and second sub-sets of cylinders, respectively to said first and second control modules.

3. The electrical connection module according to claim 1, further comprising at least one indicator representative of an operating state of each said control module.

4. The electrical connection module according to claim 1, further comprising a plurality of indicators, each representative of an operating state of said control modules.

5. The electrical connection module according to claim 1, wherein said printed circuit further supports a fourth connector of at least one device auxiliary to said heat engine.

6. The electrical connection module according to claim 1, wherein said electrical connection module is mounted to a support plate integral with said heat engine.

7. The electrical connection module according to claim 6, wherein said casing comprises a base, disposed against said support plate, sealingly secured to a cover having a common face, wherein said first connector and said third connector project from said common face.

8. The electrical connection module according to claim 1, wherein said supply terminals project from said casing.

9. The electrical connection module according to claim 1, wherein said casing comprises a removable hatch for access to at least said second connectors.

10. A generator set comprising:
   a heat engine formed by at least one sub-set of cylinders;
   an alternator connected to said heat engine so as to transform energy received from said engine into electric energy;
   in each sub-set of cylinders, at least one device for measuring and controlling parameters of said sub-set of cylinders;
   in each sub-set of cylinders, a control module for controlling said sub-set of cylinders;
   an electrical harness for connecting said at least one measurement and control device to at least one said control module; and
   an electrical connection module comprising a casing inside which is housed a printed circuit supporting:
   electric power supply terminals for said printed circuit;
   a first connector of said electrical harness;
   second connectors for electrical protection members; and
   a third connector for connecting to a diagnostic tool to assess the operating state of each said control module.

11. A generator set comprising:
   an engine comprising a first set of cylinders and a second set of cylinders;
   an alternator configured to transform energy received from said engine into electric energy;
   a first device for measuring a parameter related to said first set of cylinders;
   a second device for measuring a parameter related to said second set of cylinders;
   a first control module configured to control said first set of cylinders;
   a second control module configured to control said second set of cylinders;
   an electrical harness that connects said first device to said first control module and said second device to said second control module, said electrical harness comprising a harness connector; and
   a connection module, comprising:
      a casing;
      a printed circuit in said casing;
      an electric power supply terminal supported by said printed circuit;
      a first module connector supported by said printed circuit configured to be engaged by said harness connector;
      second connectors supported by said printed circuit;
      fuses engaged with said second connectors; and
      a third module connector supported by said printed circuit, wherein said third connector is configured to be connected to said first control module and said second control module.

12. The generator set according to claim 11, wherein said electrical harness comprises a controller area network bus connecting said third connector to said first control module and said second control module.

13. The generator set according to claim 11, wherein said connection module further comprises an indicator configured to indicate an operating state of said first control module.

14. The generator set according to claim 13, wherein said indicator comprises a first indicator, and wherein said connection module further comprises a second indicator configured to indicate an operating state of said second control module.

15. The generator set according to claim 14, wherein said first control module and said second control module are linkable according to a master-slave protocol, and wherein said connection module is configured to operate said first indicator and said second indicator as a representation of said link.

16. The generator set according to claim 14, wherein said connection module is configured to use said first indicator to indicate a power supply state of said first control module and said second indicator to indicate a power supply state of said second control module.

17. The generator set according to claim 13, wherein said operating state comprises a data recording phase.

18. The generator set according to claim 11, further comprising an auxiliary device, wherein said printed circuit supports a fourth connector configured to be connected to said auxiliary device.

19. The generator set according to claim 18, wherein said auxiliary device comprises an engine exhaust gas treatment device.

\* \* \* \* \*